(No Model.) 2 Sheets—Sheet 1.
O. B. SHALLENBERGER.
METHOD OF AND MEANS FOR TEMPERATURE ADJUSTMENT FOR INDUCTANCE COILS.
No. 548,230. Patented Oct. 22, 1895.
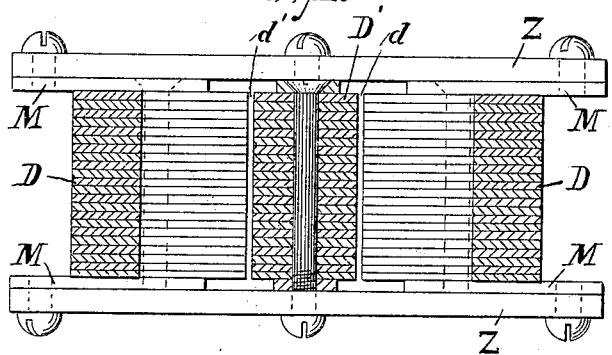
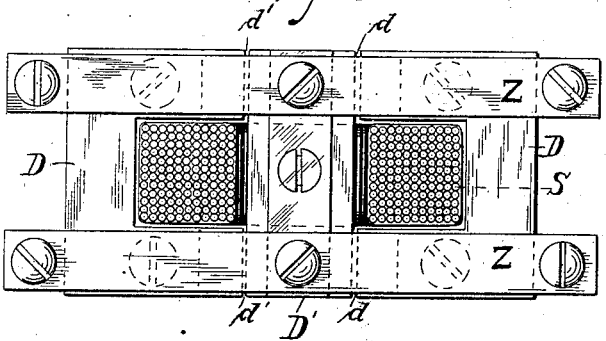
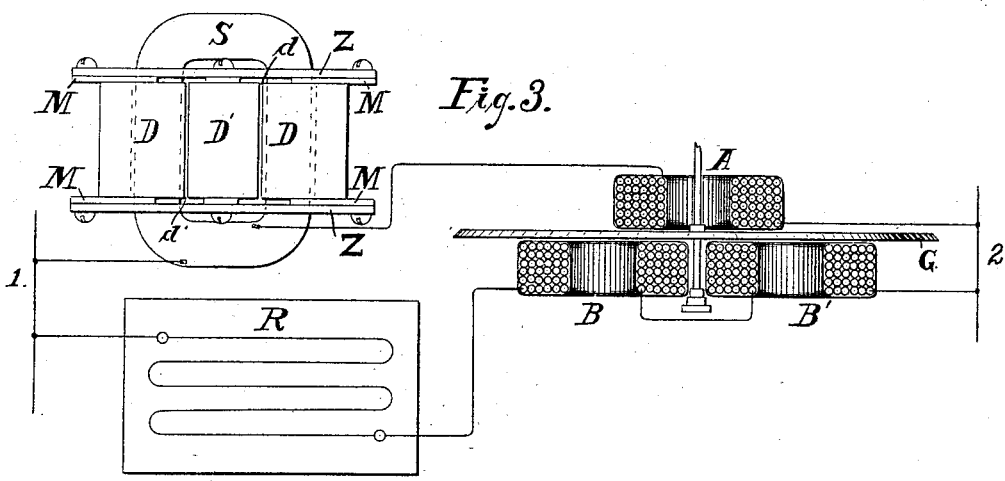
WITNESSES:
INVENTOR
Oliver B. Shallenberger
BY
Terry MacKay & Carr
ATTORNEYS.

(No Model.) 2 Sheets—Sheet 2.
O. B. SHALLENBERGER.
METHOD OF AND MEANS FOR TEMPERATURE ADJUSTMENT FOR INDUCTANCE COILS.
No. 548,230. Patented Oct. 22, 1895.
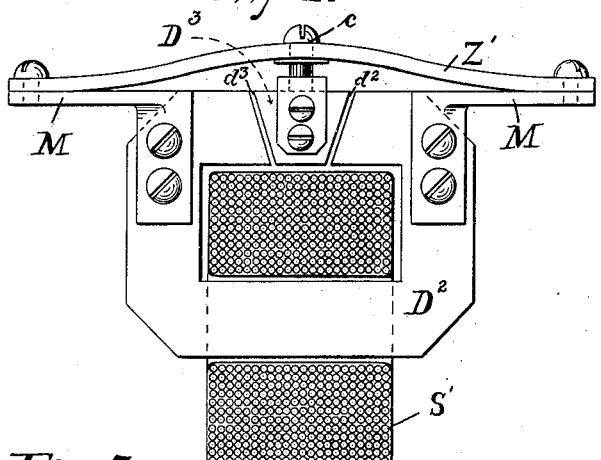
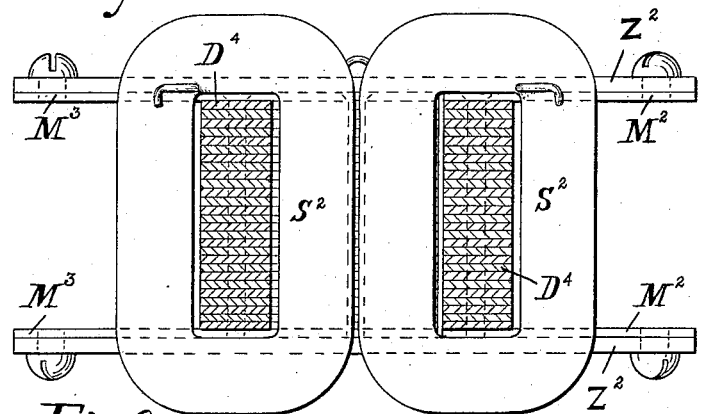
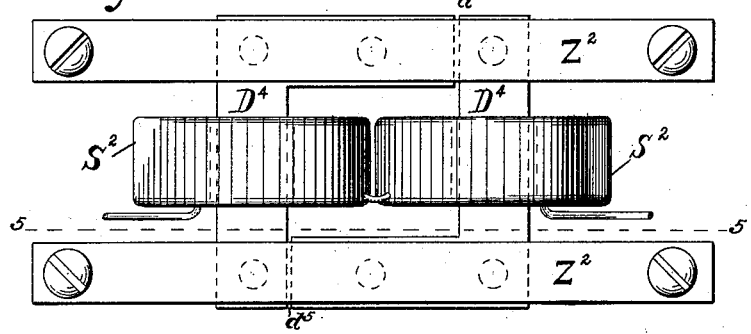

UNITED STATES PATENT OFFICE.

OLIVER B. SHALLENBERGER, OF ROCHESTER, PENNSYLVANIA.

METHOD OF AND MEANS FOR TEMPERATURE ADJUSTMENT FOR INDUCTANCE-COILS.

SPECIFICATION forming part of Letters Patent No. 548,230, dated October 22, 1895.

Application filed April 15, 1895. Serial No. 545,798. (No model.)

*To all whom it may concern:*

Be it known that I, OLIVER B. SHALLENBERGER, a citizen of the United States, residing in Rochester, in the county of Beaver and State of Pennsylvania, have invented a new and useful Improvement in Methods of and Means for Temperature Adjustment for Inductance-Coils, (Case No. 634,) of which the following is a specification.

My invention relates to alternating-current electrical apparatus, and more particularly to that class of apparatus involving the use of devices known as "inductance-coils" or "inductive resistances"; and it has for its object to produce a method and a means whereby the action of such coils may be automatically regulated or controlled to compensate for changes due to variations of temperature in the apparatus with which they are employed.

The invention is particularly well adapted for use in connection with alternating-current measuring-instruments—such, for example, as the alternating-current watt-meter and alternating-current voltmeter described in the patents granted to me January 1, 1895, and numbered, respectively, 531,868 and 531,870—although not necessarily limited in its application to such apparatus.

In the operation of such measuring-instruments as those above referred to the reading or indication is liable to be affected by changes in temperature, and it therefore becomes desirable to provide such means of regulation and adjustment as will insure a correct indication, irrespective of the temperature at that particular time. It is the object of the present invention to compensate for the variations in the apparatus due to such changes in temperature by producing an effect which shall be so opposed to the variations above referred to that the resulting indication will be practically independent of changes in temperature.

My invention will be more readily understood by reference to the accompanying drawings, in which—

Figure 1 is a central longitudinal section through the core of an inductance-coil constructed in accordance with my invention, the coil itself being omitted. Fig. 2 is a plan view of the core shown in Fig. 1, the coil being shown in section. Fig. 3 is a diagrammatic illustration of the circuits of an alternating-current voltmeter with the present invention applied to the inductance-coil included therein. Fig. 4 is a side elevation of a modified form of the inductance coil and core, the coil itself being shown in section. Fig. 5 is a longitudinal section taken on line 5 5 of Fig. 6, and Fig. 6 is a plan view of a modification of my invention in which two coils are employed.

Referring particularly to Figs. 1, 2, and 3 of the drawings, S represents a coil of insulated wire having a suitable laminated core D D′, of soft iron or steel, provided with air-gaps $d$ and $d'$, so proportioned with reference to the winding as to obtain a high coefficient of self-induction. Bolted securely to the tops and bottoms of the two outer portions D of the core are strips or bars M. Bolted to the middle section D′ of the core, and also to the ends of the bars or strips M, are bars or strips Z, of zinc or some other material, having a high coefficient of linear expansion when heated. All of the parts of the core, except the bars Z, are preferably constructed of iron; but the clamping-strips M may be of some other material, provided that it has a coefficient of expansion considerably less than that of the material of which the bars Z are constructed, it being necessary for the satisfactory operation of the device that there should be such a difference in linear expansion of the parts Z and M that the dimensions of the air-gaps $d$ and $d'$ shall be varied with the changes in temperature. The outer ends of the bars Z and M being rigidly fastened together and the remaining portions being free to expand independently, it is evident that any increase of temperature will cause a greater increase in the length of the bars Z than in that of the strips M, thus causing the air-gaps to widen. A corresponding decrease in temperature will in a similar manner cause the air-gaps to diminish in width, so that the self-induction of the coil, and consequently the current through it under a given difference of potential, will be varied to correspond with the changes in temperature.

In Fig. 3 a coil of the construction above described is connected in series with a coil A of an alternating-current voltmeter, the coils B and B′ being connected in series with a non-inductive resistance R. The disk G is caused to rotate by the influence of the magnetic fields of the coils A, B, and B', so that its deflection against the action of a spring or other opposing force is a measure of the difference of potential between the conductors 1 and 2. Owing, however, to variations in the resistance of the disk G and in that of the resistance-coil R by reason of variations in temperature, the deflection of the disk is insufficient at temperatures higher than that at which the instrument was originally tested and too great at lower temperatures when an inductance-coil of ordinary construction is employed in the circuit of the coil A. By employing the construction above described, however, the current through the coil A and the inductance-coil in series with it is automatically varied, so as to increase with an increase of temperature by an amount sufficient to compensate for the reduction of torque due to the increased resistance of the disk and of the coil A. It has been found in practice that by suitably proportioning the changes of current the temperature coefficient of the instrument may be reduced to a negligible amount.

Referring now to Fig. 4 of the drawings, S' is a coil of insulated wire and $D^2$ $D^3$ its core, preferably laminated, as is usual in similar apparatus. In this form of the inductance-coil the part $D^3$ is of wedge shape and the adjacent ends of the part $D^2$ are inclined, so as to be parallel to the sides of the part $D^3$ and form therewith the air-gaps $d^2$ and $d^3$. This section $D^3$ is supported from a pair of bars or strips Z', only one of which is shown in the drawings, by means of adjusting-screws $c$. These bars or strips Z' are preferably constructed of zinc or some other suitable material which has a large coefficient of expansion under increasing temperatures. The outer ends of the strips Z' are securely fastened to the outer ends of strips or bars M', which at their inner ends are bolted to the part $D^2$ of the core. These bars M', as in the modification shown in the preceding figures, are preferably constructed of iron, but may be of other material, provided such material has a less coefficient of expansion than that of the material of which the strips Z' are constructed. It will be readily understood from the drawings and the description thereof already given that an increase in temperature will have a warping effect upon the bars Z, thus raising the piece $D^3$ and increasing the width of the air-gaps $d^2$ $d^3$, the part $D^3$ being originally adjusted by means of the screws $c$, so that the proper width of air-gap may be automatically maintained. The curvature of the bars Z' is shown exaggerated in order that the operation of the parts may be more clearly apparent.

Referring now particularly to Figs. 5 and 6, the laminated core is composed of two L-shaped sections $D^4$, exactly alike, between which are the air-gaps $d^4$ $d^5$. These core-sections are connected to the outer ends of the expansion-bars $Z^2$ by means of the strips $M^2$, said strips being bolted at their inner ends to said core-sections.

What has been already stated with reference to the bars or strips M and Z shown in Figs. 1, 2, and 3 of the drawings applies to the corresponding parts $Z^2$, $M^2$, and $M^3$ shown in Figs. 5 and 6. In the modification of the invention shown in the last-named figures the winding is preferably formed into two coils $S^2$, as shown, for convenience of construction and greater efficiency in operation. It is obvious, however, that a single coil might be employed with this form of core, if desired.

While I have described my invention as applied to inductance-coils employed in connection with an alternating-current voltmeter, I desire to be understood that it may be used, also, in connection with other measuring-instruments and in general with any apparatus requiring such compensation for temperature changes, and I do not herein limit myself to its use in connection with any particular form of apparatus.

I claim as my invention—

1. An inductance coil provided with a core having interruptions or air gaps and an expansion bar for automatically varying the dimensions of such air gaps in accordance with changes in temperature.

2. A magnetic core having an interruption or air gap and means for automatically varying the dimensions of said air gap in accordance with temperature changes.

3. The combination with an inductive resistance and its magnetic circuit, of means for automatically modifying said magnetic circuit in accordance with temperature changes.

4. The combination with an inductive resistance having an interrupted magnetic circuit, of bodies having different degrees of expansion under variations of temperature connected with each other and with the iron constituting said magnetic circuit, whereby a mechanical displacement in said magnetic circuit and a resultant modification of said inductive resistance is effected.

5. In an alternating current measuring instrument, the combination of a circuit having a resistance varying with changes in temperature and an inductive resistance modified inversely to such variations in resistance by the differential expansion of two bodies, substantially as described.

In testimony whereof I have hereunto subscribed my name this 11th day of April, A. D. 1895.

OLIVER B. SHALLENBERGER.

Witnesses:
WM. G. WATT,
HUBERT C. TENER.